US012380392B1

(12) United States Patent
Penfield et al.

(10) Patent No.: US 12,380,392 B1
(45) Date of Patent: *Aug. 5, 2025

(54) AUTOMATED INDUSTRIAL ERGONOMICS RISK ROOT CAUSE IDENTIFICATION AND MANAGEMENT

(71) Applicant: VelocityEHS Holdings, Inc., Chicago, IL (US)

(72) Inventors: Julia Penfield, Seattle, WA (US); Richard Thomas Barker, West Chester, OH (US); Veeru Talreja, Morgantown, WV (US)

(73) Assignee: VELOCITYEHS HOLDINGS, INC., Chicago, IL (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/543,752

(22) Filed: Dec. 18, 2023

Related U.S. Application Data

(63) Continuation of application No. 18/133,865, filed on Apr. 12, 2023, now Pat. No. 11,922,358.

(51) Int. Cl.
*G06Q 10/0639* (2023.01)
*G06Q 10/0635* (2023.01)
*G06V 20/52* (2022.01)

(52) U.S. Cl.
CPC ... *G06Q 10/06398* (2013.01); *G06Q 10/0635* (2013.01); *G06V 20/52* (2022.01)

(58) Field of Classification Search
CPC ............. G06Q 10/063; G06Q 10/0639; G06Q 10/06398; G06Q 10/0635; G06V 20/52; G06V 20/50
See application file for complete search history.

(56) References Cited

U.S. PATENT DOCUMENTS

| 2020/0273580 A1* | 8/2020 | Kaszuba | G06F 18/251 |
| 2020/0279102 A1* | 9/2020 | Radwin | G06V 40/103 |
| 2020/0327465 A1* | 10/2020 | Baek | G16H 50/20 |
| 2021/0125342 A1* | 4/2021 | Li | G06V 40/23 |

(Continued)

FOREIGN PATENT DOCUMENTS

AU    2009238336 B2 *  5/2015  ............. G06Q 10/00

OTHER PUBLICATIONS

Zanela et al. Using a Video Device and a Deep Learning-Based Pose Estimator to Asses Gait Impairment in Neurodegenerative Related Disorders: A Pilot Study. Applied Sciences. (2022) 12(9), 4642. (Year: 2022).*

*Primary Examiner* — William S Brockington, III
(74) *Attorney, Agent, or Firm* — K&L Gates LLP

(57) ABSTRACT

A system for identifying industrial ergonomics risk root-causes and providing risk control actions, comprising: a computing device configured to obtain video signals of a worker performing a job at a workplace; and a computing server system configured to receive and process the video signals to determine joint locations of the worker, calculate joint angles for each body region of the worker based on the joint locations, calculate, based on the joint angles, a risk score for each body region of the worker in a plurality of risk categories, calculate a risk rating for each body region of the worker based on the risk score, determine ergonomic risk root-causes for each body region of the worker based on the risk rating, and provide ergonomic risk control recommendations to mitigate the ergonomic risk root-causes.

32 Claims, 7 Drawing Sheets

(56) References Cited

U.S. PATENT DOCUMENTS

| | | | | |
|---|---|---|---|---|
| 2021/0232810 A1* | 7/2021 | Parsa | ................ | G06N 3/08 |
| 2022/0386942 A1* | 12/2022 | Diaz-Arias | ............ | A61B 5/45 |
| 2023/0177228 A1* | 6/2023 | Bourret | ................ | G06F 30/17 |
| | | | | 703/7 |

* cited by examiner

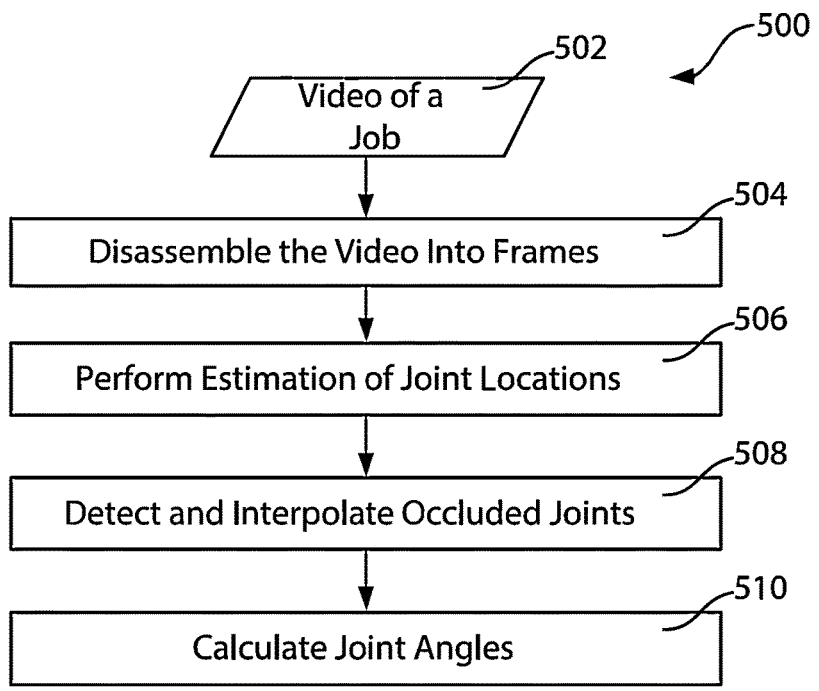
FIG. 5
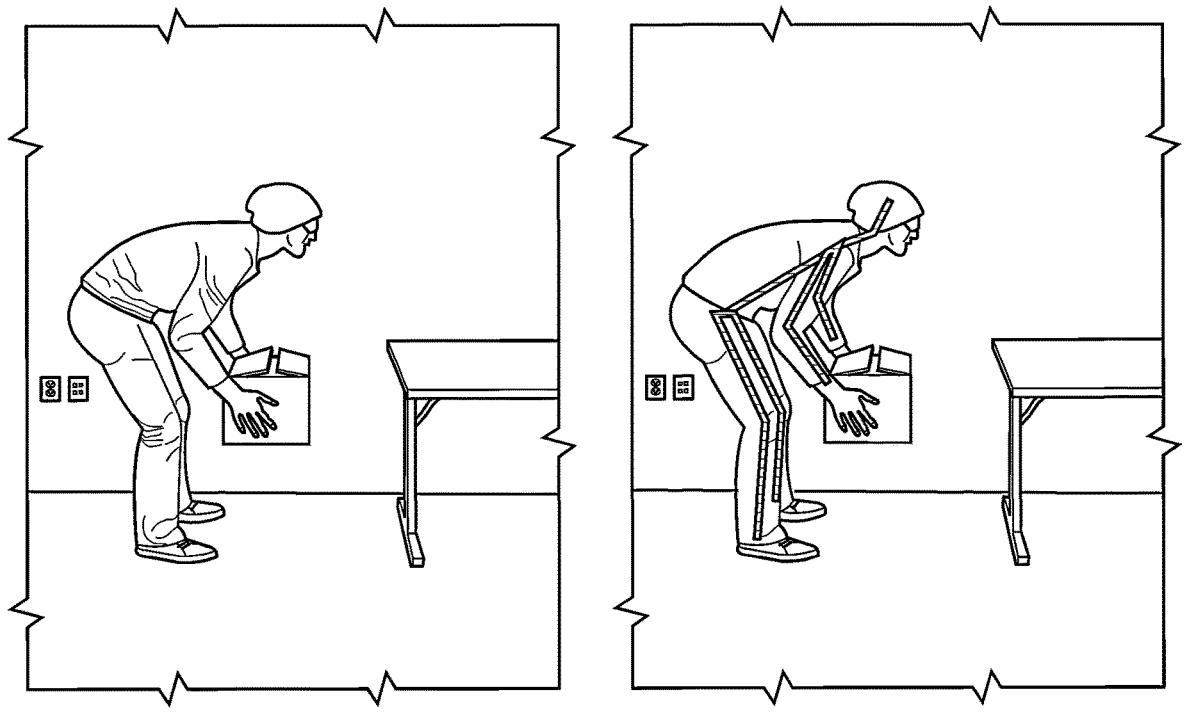
FIG. 6A  FIG. 6B

|   | Hands/wrists | | Elbows | | Shoulders | | Neck | Back | Legs |
|---|---|---|---|---|---|---|---|---|---|
|   | Left | Right | Left | Right | Left | Right |   |   |   |
| Score ▲ | 1 | 1 | 6 | 6 | 6 | 5 | 5 | 7 | 4 |
| Force | 0 | 0 | 0 | 0 | 0 | 0 | 0 | 0 | 0 |
| Posture | 1 | 1 | 3 | 3 | 2 | 1 | 2 | 3 | 1 |
| Duration | 0 | 0 | 2 | 2 | 3 | 3 | 2 | 3 | 2 |
| Frequency |  | 0 | 1 | 1 | 1 | 1 | 1 | 1 | 1 |
| Risk Rating | Lower | Lower | High | High | High | High | High | Higher | High |

Cause #1 Edit

Parts are presented, delivered, or stored too low

Pallet/container is delivered at floor height

*Description*

*Category*
Workstation Layout

*Status*
Not Addressed

Apply to Another body Region

Suggested Controls

☐ Provide a fixed-height pallet stand

☐ Provide a pallet lift table

☐ Provide a portable lift cart or pallet lift

AUTOMATED INDUSTRIAL ERGONOMICS RISK ROOT CAUSE IDENTIFICATION AND MANAGEMENT

CROSS-REFERENCES TO RELATED APPLICATIONS

This Non-Provisional U.S. Application claims priority to and is a Continuation of U.S. application Ser. No. 18/133,865 titled "METHOD AND SYSTEM FOR INDUSTRIAL ERGONOMICS RISK ROOT CAUSE IDENTIFICATION AND MANAGEMENT" filed Apr. 12, 2023, which is hereby incorporated by reference in its entirety.

FIELD OF TECHNOLOGY

The present disclosure generally relates to methods and systems for analyzing ergonomic risk factors at the workplace, and more particularly relates to methods and systems configured to identify industrial ergonomics risk root-causes and provide risk control actions accordingly.

BACKGROUND

Musculoskeletal disorders generally refer to a common type of work related illness and have been recognized as a major cause of absence among working populations. Conditions that are caused or exacerbated by activities at the workplace are often labeled as work-related musculoskeletal disorders (WMSDs) and are characterized by discomfort of nerves, tendons, muscles, and supporting structures of the body. WMSDs can affect the ability of workers to perform the required occupational activities which could have a negative effect on productivity. WMSDs and their relation to lost workdays in the health care industry have been studied and found to account for a substantial portion of the WMSD burden on society. In order to minimize the risk of workers developing WMSDs, it is crucial to conduct an effective workplace risk assessment from an ergonomic standpoint. Most employers do not have ergonomics expertise and rely on subject matter experts (SMEs) to administer questionnaires and observe the workplace. However, it is often a time-consuming process from dispatching ergonomics SMEs to workplaces to waiting for risk assessment reports based on observations. With questionnaires, observational assessment tools, expert evaluations, and job-exposure matrices, employers may have a sufficient number of tools to conduct risk assessment, but each tool comes with a number of limitations that leave the risk assessment incomplete.

Accordingly, it is desirable to develop a method and system equipped with computer vision and machine learning capabilities to automatically perform ergonomics risk assessment based on the video recordings of employees performing various work tasks in any industrial setup.

Further, since employers may not be equipped with the required knowledge to identify the root causes of high ergonomics risk, it is also desirable to identify the most likely root causes of high ergonomics risk at the workplace and provide recommended corrective risk control actions, such that the employers can prevent soft tissue and other ergonomics related injuries at the workplace.

SUMMARY

In one aspect, the present disclosure provides a system deployed within a Cloud-based communication network, the system comprising a computing device, which includes a non-transitory computer-readable storage medium configured to store an application program; and processor coupled to the non-transitory computer-readable storage medium and configured to control a plurality of modules to execute instructions of the application program to obtain video signals of a worker performing a job at a workplace. The system further comprises a computing server system configured to: receive the video signals, process the video signals to determine joint locations of the worker, calculate joint angles for each of a plurality of body regions of the worker based on the joint locations, calculate, based at least upon the joint angles, a risk score for each of the plurality of body regions of the worker in each of a plurality of risk categories, calculate a risk rating for each of the plurality of body regions of the worker based on the risk score for each of the plurality of body regions of the worker in selected ones of the plurality of risk categories, determine ergonomic risk root-causes for each of the plurality of body regions of the worker based on the risk rating, and provide ergonomic risk control recommendations to mitigate the ergonomic risk root-causes.

In one embodiment, the computing server system may be configured to process the video signals to determine the joint locations of the worker by at least disassembling the video signals into image frames and using a deep learning model to process each image frame to estimate the joint locations of the worker in each image frame.

For example, the computing server system may be configured to use the deep learning model to process each image frame through a multi-stage convolutional neural network to generate a confidence map for each of the plurality of body regions of the worker and determine a degree of association among the plurality of body regions at each deep learning stage.

The computing server system may be further configured to identify one or more image frames including at least one occluded body region based on the confidence map and interpolate a position of the at least one occluded body region based on an angle and distance from a parent joint in accordance with the degree of association among the plurality of body regions.

In accordance with aspects of the present disclosure, the plurality of body regions of the worker may include a neck part, a back part, a hand/wrist part, a left shoulder part, a right shoulder part, a left elbow part, a right elbow part, a left knee part, and a right knee part.

In another aspect, the computing server system may be configured to calculate the risk score for each of the plurality of body regions of the worker in the awkward posture category by at least comparing the joint angles for each of the plurality of body regions of the worker with a set of predetermined threshold values, wherein the set of predetermined threshold values correspond to a degree that the joint angles deviate from a neutral position of the worker, and the risk score increases in response to detecting that the degree increases.

Further, the computing server system may be configured to calculate the risk score for each of the plurality of body regions of the worker in the duration category by at least identifying the worst posture for at least one body region based on the video signals, and determining a percent of time of the at least one body region present in the worst posture, wherein the risk score increases in response to detecting that the percent of time increases.

The computing server system may be configured to calculate the risk score for each of the plurality of body regions of the worker in the frequency category by at least identifying a number of problematic posture occurrences of at least one body region during a selected period of time.

In another aspect, the computing device may obtain information related to a force exerted by the worker in performing the job, and the computing server system may calculate the risk score for each of the plurality of body regions of the worker in the force category by at least comparing the information related to the force with a set of predetermined threshold values, wherein the information related to the force includes a direction and a magnitude of the force, and the risk score increases in response to detecting that the magnitude of the force increases.

In accordance with another aspect, the present disclosure may relate to a computer-implemented method, comprising: obtaining, by a processor of a computing device deployed within a Cloud-based communication network, video signals of a worker performing a job at a workplace; receiving, by a computing server system deployed within the Cloud-based communication network, the video signals; processing, by the computing server system, the video signals to determine joint locations of the worker; calculating, by the computing server system, joint angles for each of a plurality of body regions of the worker based on the joint locations; calculating, by the computing server system, based at least upon the joint angles, a risk score for each of the plurality of body regions of the worker in each of a plurality of risk categories; calculating, by the computing server system, a risk rating for each of the plurality of body regions of the worker based on the risk score for each of the plurality of body regions of the worker in selected ones of the plurality of risk categories; determining, by the computing server system, ergonomic risk root-causes for each of the plurality of body regions of the worker based on the risk rating; and providing, by the computing server system, ergonomic risk control recommendations to mitigate the ergonomic risk root-causes.

In one embodiment, the processing, by the computing server system, the video signals to determine the joint locations of the worker may comprise disassembling the video signals into image frames; using a deep learning model to process each image frame to estimate the joint locations of the worker in each image frame by processing each image frame through a multi-stage convolutional neural network to generate a confidence map for each of the plurality of body regions of the worker and determine a degree of association among the plurality of body regions at each deep learning stage; and identifying one or more image frames including at least one occluded body region based on the confidence map and interpolate a position of the at least one occluded body region based on an angle and distance from a parent joint in accordance with the degree of association among the plurality of body regions.

The plurality of body regions of the worker may include a neck part, a back part, a hand/wrist part, a left shoulder part, a right shoulder part, a left elbow part, a right elbow part, a left knee part, and a right knee part. Moreover, the plurality of risk categories may include an awkward posture category, a duration category, a frequency category, and a force category.

In yet another aspect, the computer-implemented method may further comprise obtaining, by the computing device, information related to a force exerted by the worker in performing the job; calculating, by the computing server system, the risk score for each of the plurality of body regions of the worker in the awkward posture category by at least comparing the joint angles for each of the plurality of body regions of the worker with a set of predetermined threshold values, wherein the set of predetermined threshold values correspond to a degree that the joint angles deviate from a neutral position of the worker, and the risk score increases in response to detecting that the degree increases; calculating, by the computing server system, the risk score for each of the plurality of body regions of the worker in the duration category by at least identifying the worst posture for at least one body region based on the video signals, and determining a percent of time of the at least one body region present in the worst posture, wherein the risk score increases in response to detecting that the percent of time increases; calculating, by the computing server system, the risk score for each of the plurality of body regions of the worker in the frequency category by at least identifying a number of problematic posture occurrences of at least one body region during a selected period of time; calculating, by the computing server system, the risk score for each of the plurality of body regions of the worker in the force category by at least comparing the information related to the force with a set of predetermined threshold values, wherein the information related to the force includes a direction and a magnitude of the force, and the risk score increases in response to detecting that the magnitude of the force increases.

In yet another aspect, the present disclosure relates to a non-transitory computer readable medium storing computer executable instructions for a system deployed in a Cloud-based communication network, the instructions being configured for: obtaining, by a processor of a computing device deployed within a Cloud-based communication network, video signals of a worker performing a job at a workplace; receiving, by a computing server system deployed within the Cloud-based communication network, the video signals; processing, by the computing server system, the video signals to determine joint locations of the worker; calculating, by the computing server system, joint angles for each of a plurality of body regions of the worker based on the joint locations; calculating, by the computing server system, based at least upon the joint angles, a risk score for each of the plurality of body regions of the worker in each of a plurality of risk categories; calculating, by the computing server system, a risk rating for each of the plurality of body regions of the worker based on the risk score for each of the plurality of body regions of the worker in selected ones of the plurality of risk categories; determining, by the computing server system, ergonomic risk root-causes for each of the plurality of body regions of the worker based on the risk rating; and providing, by the computing server system, ergonomic risk control recommendations to mitigate the ergonomic risk root-causes.

In one embodiment, wherein the instructions for determining, by the computing server system, the joint locations of the worker may comprise instructions for: disassembling the video signals into image frames; using a deep learning model to process each image frame to estimate the joint locations of the worker in each image frame by processing each image frame through a multi-stage convolutional neural network to generate a confidence map for each of the plurality of body regions of the worker and determine a degree of association among the plurality of body regions at each deep learning stage; and identifying one or more image frames including at least one occluded body region based on the confidence map and interpolate a position of the at least one occluded body region based on an angle and distance from a parent joint based in accordance with the degree of association among the plurality of body regions.

In one aspect, the plurality of body regions of the worker may include a neck part, a back part, a hand/wrist part, a left shoulder part, a right shoulder part, a left elbow part, a right elbow part, a left knee part, and a right knee part. Further, the plurality of risk categories may comprise an awkward posture category, a duration category, a frequency category, and a force category.

In addition, the non-transitory computer readable medium of the present disclosure may further comprise instructions for: obtaining, by the computing device, information related to a force exerted by the worker in performing the job; calculating, by the computing server system, the risk score for each of the plurality of body regions of the worker in the awkward posture category by at least comparing the joint angles for each of the plurality of body regions of the worker with a set of predetermined threshold values, wherein the set of predetermined threshold values correspond to a degree that the joint angles deviate from a neutral position of the worker, and the risk score increases in response to detecting that the degree increases; calculating, by the computing server system, the risk score for each of the plurality of body regions of the worker in the duration category by at least identifying the worst posture for at least one body region based on the video signals, and determining a percent of time of the at least one body region present in the worst posture, wherein the risk score increases in response to detecting that the percent of time increases; calculating, by the computing server system, the risk score for each of the plurality of body regions of the worker in the frequency category by at least identifying a number of problematic posture occurrences of at least one body region during a selected period of time; calculating, by the computing server system, the risk score for each of the plurality of body regions of the worker in the force category by at least comparing the information related to the force with a set of predetermined threshold values, wherein the information related to the force includes a direction and a magnitude of the force, and the risk score increases in response to detecting that the magnitude of the force increases.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5 illustrates a flowchart of a computer vision-based motion capture process for joint angle calculation by the system of FIG. 1, according to an exemplary aspect of the present disclosure;

FIGS. 6A and 6B respectively illustrate a single image frame processed by the system of FIG. 1 to determine skeleton keypoints and overlay estimated joint locations on the image of the same frame, according to an exemplary aspect of the present disclosure;

DETAILED DESCRIPTION

Figure 1:
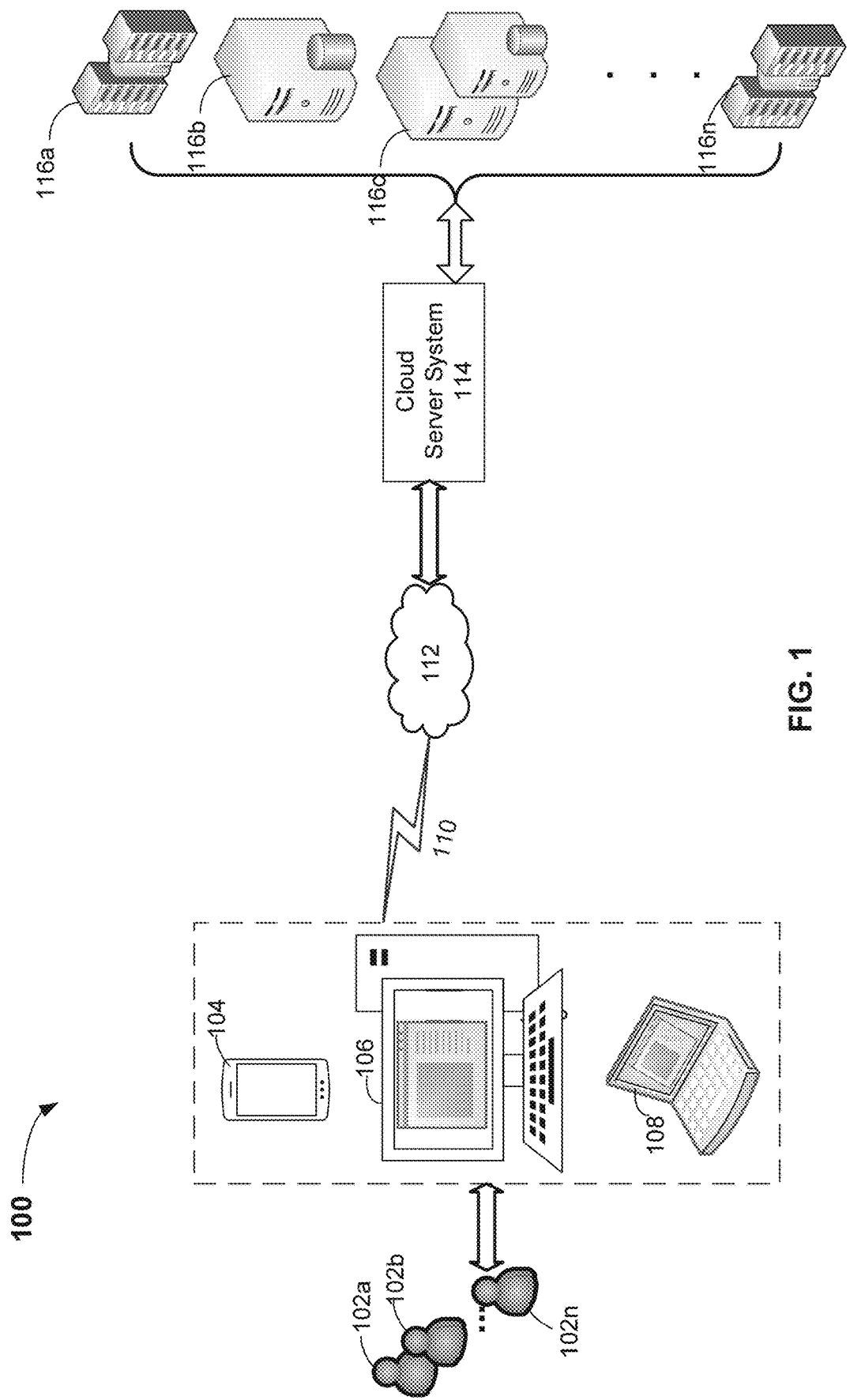
FIG. 1 illustrates an overall architecture of a computer vision assisted automated industrial ergonomics risk assessment, ergonomics risk root-cause identification, and ergonomics risk control actions recommendation system, according to an exemplary aspect of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Referring to FIG. 1, in accordance with aspects of the present disclosure, a system 100 deployed within a Cloud-based (and/or server-based) computing environment and communication network may be configured to provide relevant stakeholders 102a, 102b . . . 102n (e.g., employers, safety professionals, etc.) with an ergonomics risk assessment of a workplace based on video recordings of employees performing various work tasks in any industrial setup. As will be described fully below, system 100 may be configured to identify the most likely root-causes of high ergonomics risk at the workplace and provide recommended corrective risk control actions. In one embodiment, an application, which may be a mobile or web-based application (e.g., native iOS or Android Apps), is downloaded and installed on a selected computing device or system 104, 106 or 108 for obtaining a video of a worker performing a job and information regarding forces being applied or exerted during a series of work activities of the job. Computing device 104, 106 or 108 hosting the mobile or web-based application may be configured to connect, via suitable communication protocol 110 and network 112, with a remote Cloud server system 114 which may be configured to use machine learning based computer vision (e.g., motion capture) technology to analyze the video recording in order to estimate the body joint locations of the worker performing the series of activities, and determine joint angles between different body parts. In one aspect, the Cloud server system 114 may be configured to calculate prioritized risk scores for different body parts of the worker using at least the determined body joint angles. The high-risk scores may be mapped to the most likely root causes. One or more risk control actions may be determined and presented to the user for each identified root-cause. Subsequently, system 100 may be configured to analyze the obtained computer vision data to identify the prioritized risks by a number of body regions of the worker, identify significant ergonomics risks and the most likely root-causes thereof, and recommend risk control actions to reduce or eliminate such risk exposures accordingly.

Figure 2:
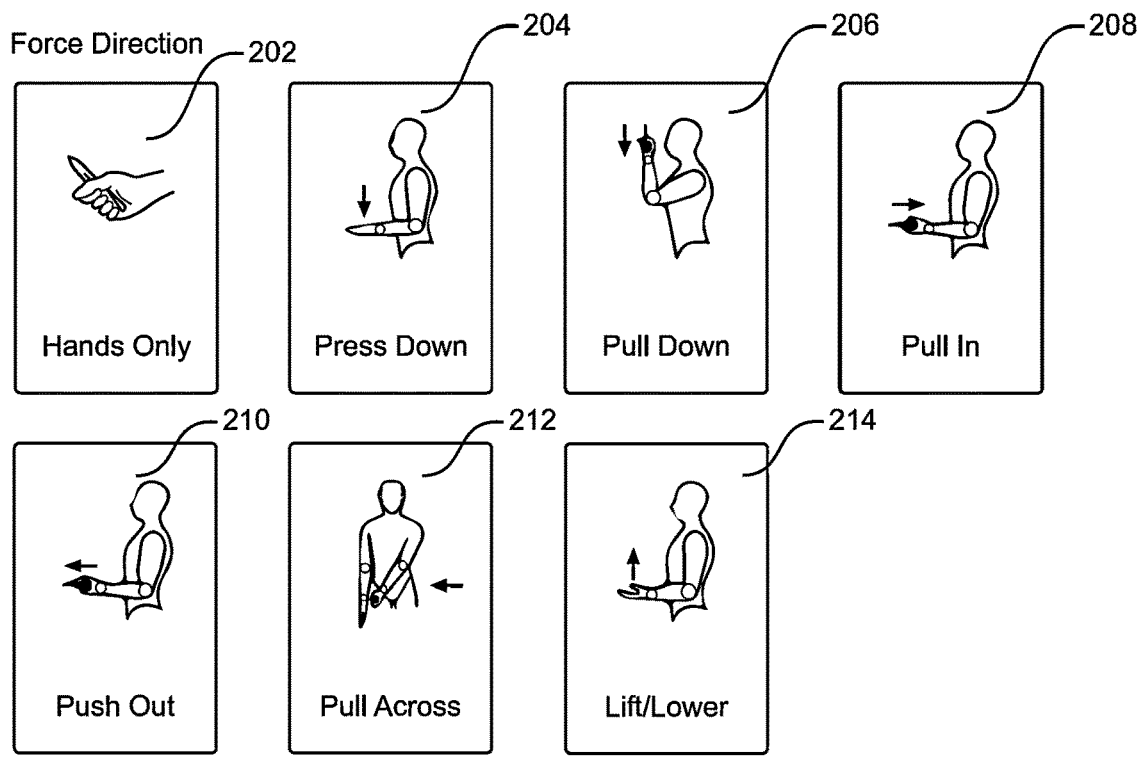
FIG. 2 illustrates user-selectable force information as an input to the system of FIG. 1, according to an exemplary aspect of the present disclosure.
Figure 3:
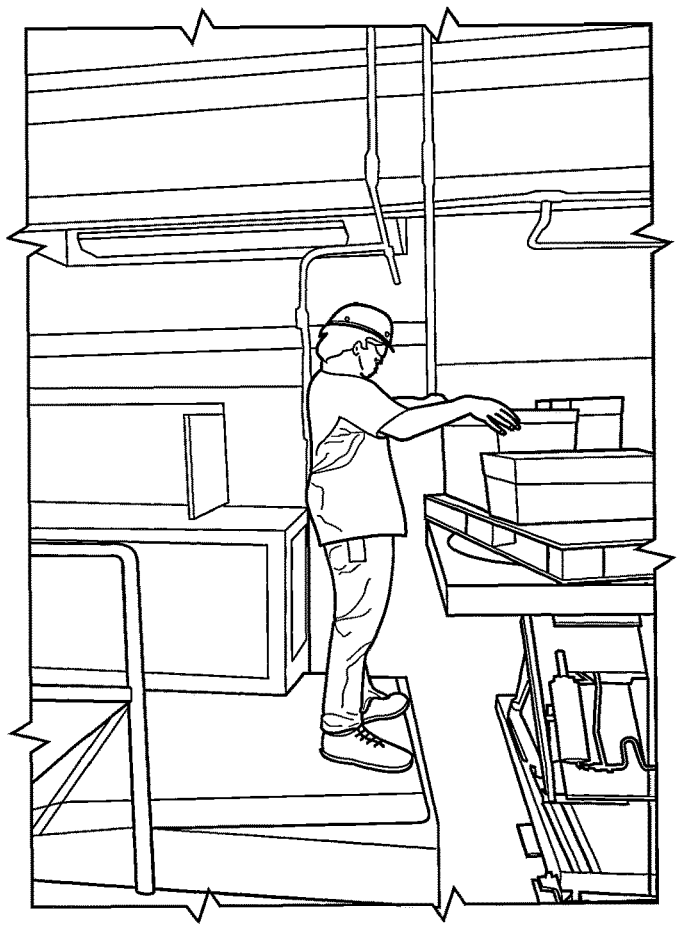
FIG. 3 illustrates a single frame extracted by the system of FIG. 1 from a video recording of a worker performing a job at a workplace, according to an exemplary aspect of the present disclosure.

For example, in one preferred embodiment, a user (e.g., at least one of 102a, 102b . . . 102n) of system 100 of the present disclosure may be prompted to upload a video recording of a worker performing a job to the application hosted by one of the computing device or system 104, 106 or 108. In addition, the user may be prompted to enter force information if any force is exerted during the work activities being recorded in the video. Referring to FIG. 2, the user may select hand contact force captured by the hand pose and/or force direction from one of: "Hands Only" 202, "Press Down" 204, "Pull Down" 206, "Pull In" 208, "Push Out" 210, "Pull Across" 212, and "Lift/Lower" 214. Thereafter, the Cloud server system 114 of the present disclosure may be configured to perform an ergonomic risk assessment, root-cause identification, and risk control action recommendation by extracting and analyzing each frame (e.g., a single frame shown in FIG. 3) of the video recording and the obtained force information. For example, every cycle of an evaluated pushing task (e.g., "Push Out" 210 in FIG. 2) may start from the natural standing pose of a worker, through the forceful exertion during pushing, until returning to a next standing pose. Identifying the time frame a forceful exertion happens and its peak magnitude may be critical for ergonomic risk assessment. In one aspect, the peak force may be used to analyze the severity of the exertion, while the duration of an exertion's occurrence may identify the combined impact from co-occurred forceful exertion and an awkward posture of the worker which can lead to WMSDs at the workplace. An awkward posture may refer to any deviation from the natural or neutral position of a body part. A neutral position places minimal stress on the body part. Example awkward postures may include reaching overhead or behind the head; twisting at the waist; bending the torso forward, backward, or to the side; squatting; kneeling; and bending the wrist. The Cloud server system 114 of the present disclosure may perform a frame-by-frame analysis of the uploaded video to identify and compare the peak force and its time frame. Given the frame rate of the video is 30 frames per section (fps), the time of peak force may be calculated from the frame index divided by the frame rate.

It should be appreciated that each of the computing devices or systems 104, 106, 108 may comprise at least one of computing devices, servers, server farms, laptops, tablets, mobile devices, smart phones, smart watches, fitness tracker devices, cellular devices, gaming devices, media players, network enabled printers, routers, wireless access points, network appliances, storage systems, any suitable databases, gateway devices, smart home devices, virtual or augmented reality devices, or any other suitable devices that are deployed in the same or different communication networks of these computing devices and systems. The Cloud server system 114 may be configured to provide functionalities for any connected devices such as sharing data or provisioning resources among multiple client devices, or performing computations for each connected client device. The term "server" generally refers to a computing device or system, including processing hardware and process space(s), an associated storage medium such as a memory device or database, and, in some instances, at least one database application as is well known in the art. It should also be understood that "server system" and "server" are often used interchangeably herein.

In one embodiment, computing devices 104, 106, 108 and any connected computing devices of the system 100 may be configured to communicate with the Cloud server system 114 via a communication network 112 using suitable network connections and protocols 110. A communication network (e.g., communication network 112) may refer to a geographically distributed collection of computing devices or data points interconnected by communication links and segments for transporting signals and data therebetween. A protocol (e.g., protocol(s) 110) may refer to a set of rules defining how computing devices and networks may interact with each other, such as frame relay, internet protocol (IP), transmission control protocol (TCP), user datagram protocol (UDP), hypertext transfer protocol (HTTP). Many types of communication networks are available, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network. Computing devices 104, 106 and 108 may be configured to communicate in a peer to peer manner to replace, duplicate, supplement or extend the functionalities of communication network 112.

In one aspect, the Cloud server system 114 of the present disclosure may be configured to provide various computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, virtual machines, databases, applications, etc. The term "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), extendible markup language (XML), TeXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Within the system 100, Cloud computing resources accessible via any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers.

The Cloud server system 114 of the present disclosure may be configured to connect with various data sources or services 116a, 116b, 116c, . . . 116n. In one embodiment, as will be described fully below, the Cloud server system 114 may be configured to generate a list of likely root-causes for identified high ergonomics risks that may be selected from the thousands of ergonomics assessments performed by ergonomics experts. One of the data sources or services 116a, 116b, 116c, . . . 116n may comprise a database of control options to use in job assessment reports provided during consulting projects over the past several decades. This database of controls may be used to identify potential controls associated with each specific root cause identified. These lists of likely root causes and controls may be supplemented by information from MSD cause and control charts developed for the United States Air Force (DTIC AD-A325515, AD-A325660, AD-A361230). For another example, one of the data sources or services 116a, 116b, 116c, . . . 116n may comprise an artificial intelligence based diagnostic system or an expert or knowledge based diagnostic or evaluation system for providing or optimizing recommendations that may include text, audio, video, and other rich media explanations.

Figure 4:
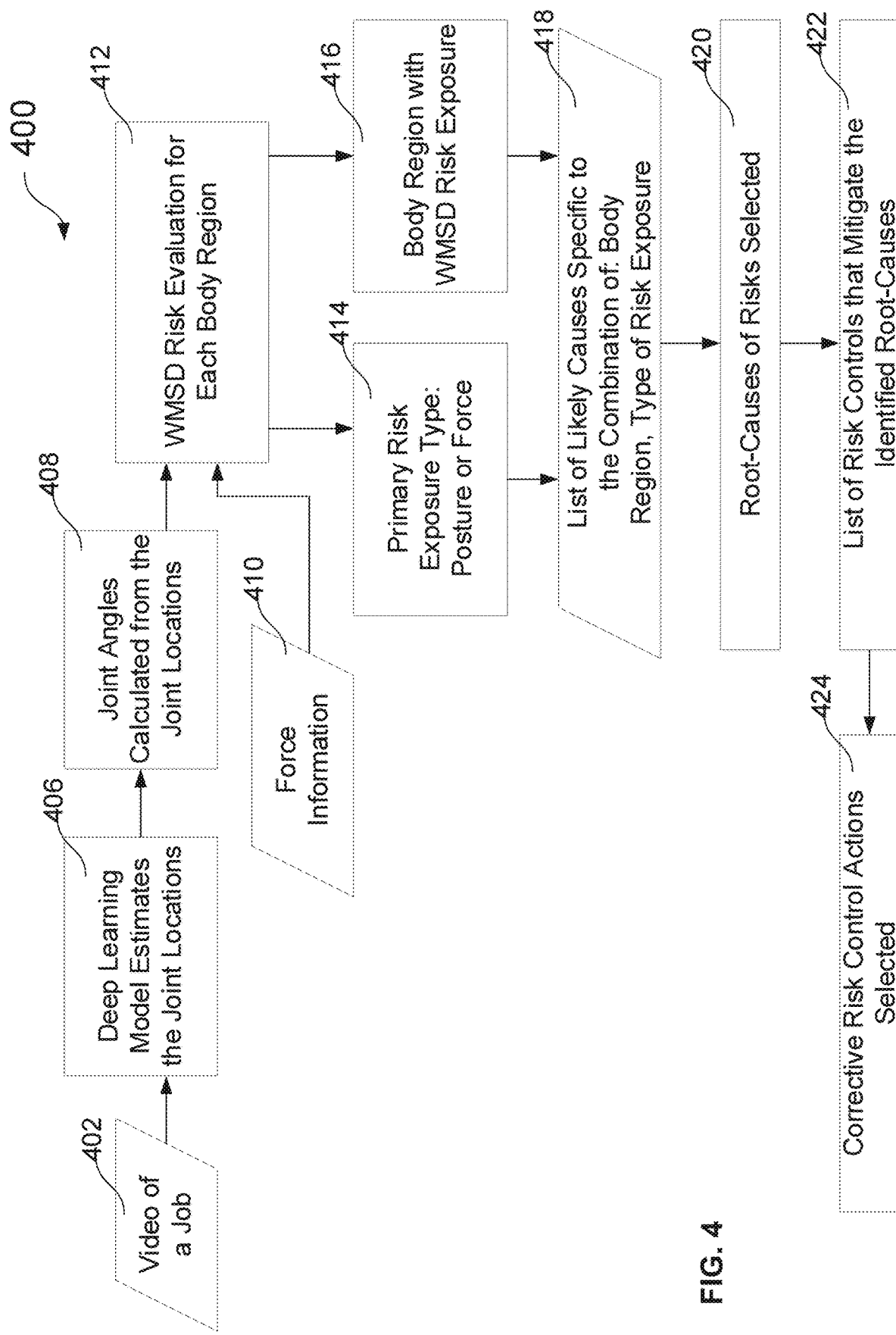
FIG. 4 illustrates an overall workflow of the system of FIG. 1, according to an exemplary aspect of the present disclosure.

FIG. 4 illustrates an example overall workflow 400 of the ergonomics risk root-cause analysis and risk controls recommendation system 100 of the present disclosure. As disclosed previously, input data required by the system 100 to provide the priority risk scores may include video signals 402 showing a worker performing a job and optional force information (e.g., magnitude and direction of the force) 410 if any force is exerted during the job. The system 100 may be configured to utilize 406 computer vision technology and deep learning framework to process the uploaded video signals and generate estimates for various body joint locations. Joint angles may be calculated 408 from the estimated body joint locations. If there is force involved in the recorded work task, the user may be prompted to enter the optional force information 410 for determining whether the recommended force maximums for the job are being exceeded. The system 100 may be configured to assess the direct root-causes of ergonomics risks and provide recommendations and improvement measures based at least upon the uploaded video signals and optional force information. As will be described fully below, the Cloud server system 114 may be configured to determine primary risk exposure type (e.g., posture or force) 414 and identify body region(s) with WMSD risk exposure 416. In one aspect, the system 100 may be configured to generate a list of likely root-causes specific to the combination of the identified body region(s) and type of risk exposure 418. Thereafter, the user of the system 100 may select the most likely root-causes 420. A list of risk controls that mitigate the identified root-causes 420 may be provided to the user who can further select the appropriate corrective risk control actions 424.

In accordance with aspects of the present disclosure, FIG. 5 illustrates a flowchart 500 of a computer vision-based motion capture process for joint angle calculation by the system 100. For example, the user-facing application of the system 100 may include a plurality of modules executed and controlled by the processor of the hosting computing device or system 104, 106 or 108 for obtaining, analyzing and processing a video. In one example, a video receiving/communication interface module (not shown) of the user-facing application may prompt the user of the system 100 to directly record a video of a worker performing a series of work activities 502 via the hosting computing device or system 104, 106 or 108. In another example, the video receiving/communication interface module may be configured to receive video signals via, e.g., a universal serial bus (USB) connector (e.g., USB-A, USB-B, USB-B Mini, USB-B Micro, USB-C, USB4, Lightning) or any suitable ports or connectors, from external sources (e.g., any suitable video file storage devices or video players such as CD/DVD disc players, digital cameras and sensors, web cameras, or any suitable computing devices and imaging devices with video recording capabilities). In some embodiments, the video receiving/communication interface module may be configured to receive video transmission signals in both analog and digital formats. Further, the user-facing application may use a control module (e.g., processor/microprocessor of the hosting computing device or system 104, 106 or 108) to identify the file format of the received video and determine whether the video is eligible for motion capture processing (e.g., 2D joint location prediction). In certain embodiments, a video format converting module (not shown) may be implemented for converting the format of video signals originally received by the video receiving interface module into digital video files in a targeted format required by the Cloud server system 114 for further processing. The system 100 of the present disclosure may process and convert video files in various formats including but not limited to MP4 (MPEG-4 Part 14), MOV (QuickTime Movie), WMV (Windows Media Viewer), AVI (Audio Video Interleave), AVCHD (Advanced Video Coding High Definition), flash video formats FLV, F4V, and SWF (Shockwave Flash), MKV, WEBM or HTML5, and MPEG-2. Subsequently, the video receiving/communication interface module may transmit the obtained video signals to the Cloud server system 114 or any of external data services 116a, 116b, 116c, . . . 116n for an initial verification whether the video is eligible for motion capture processing (e.g., 2D joint location prediction) and/or format conversion. For example, a number of parameters may be checked during the initial verification process: the resolution of the video recording; the bitrate of the video recording; the duration of the video recording; the file size of the video recording; and the format of the video recording. In one preferred embodiment, video files in MP4 or MOV format may be used by the Cloud server system 114.

To facilitate bi-directional communication, the video receiving/communication interface module of the user-facing application may also be used to receive the stream of video signals transmitted from one or more multimedia data processing sources (e.g., the Cloud server system 114 or any of external data services 116*a*, 116*b*, 116*c*, ... 116*n*), save the received video signals locally on the hosting computing device or system 104, 106 or 108, and/or transmit the received video signals to other computing devices deployed within the system 100.

The uploaded video may be transmitted to the Cloud server system 114 for processing. For example, the video may be disassembled 504 into image frames using a rate of 30 fps. Each image frame generated in the previous step may be processed using a deep learning model to estimate the 2D keypoint (joint locations estimation) for the worker in the image.

For example, after localizing and segmenting the subject (e.g., the worker performing the job) in the video sequence, the Cloud server system 114 may be configured to take a color image of size w×h as the input and generate the 2D locations of anatomical keypoints 506 for each person in the image as the output. The input may include at least one of an image, video files, and information provided by webcam, Flir/Point Grey, IP camera, or any custom input source (e.g., depth camera). The output may include basic image optionally overlayed with keypoints and saving (PNG, JPG, AVI, . . . ), keypoint saving (JSON, XML, YML, . . . ), keypoints as array class, and custom output code (e.g., certain fancy UI).

A skeleton structure of a human body (human torso and head and limb position diagram of the body) generated by computer vision and motion capture technology of the present disclosure may determine the geometric structure of the human movement. Relative position of the joints in the skeleton may determine the posture of the body. Skeleton estimation may be performed based on depth images or RGB images that may be obtained from pictures or video recordings.

A depth image usually contains the position information of an object identified in the image (e.g., human joint points). Therefore, human skeletons may be estimated based on the position information of joint points to infer human behavior. There are two methods to obtain depth images: passive range sensor and active depth sensor. For example, the most commonly used method of the passive range sensor is binocular stereo vision, which obtains two images of the same scene at the same time by two cameras with a certain distance apart, locates the corresponding pixel points in two images by stereo algorithm, and then calculates the time difference information according to the triangle principle. The time difference information can represent the depth information of the object in the scene by conversion. Based on the stereo matching algorithm, the depth image of the same scene can also be obtained by photographing a group of images with different angles in the same scene. Compared with the passive range sensor, the active depth sensor has the most important feature: the equipment itself needs to transmit energy to complete the depth information collection. Example active depth sensors may include time-of-flight cameras and Kinect sensors.

RGB images based skeleton estimation includes human skeleton keypoints detection. It mainly detects certain keypoints of a human body, and determines human skeleton information through these keypoints.

In one embodiment, the Cloud server system 114 may be configured to receive RGB images (e.g., image frames obtained from the received video signals) as an input and process them through a baseline convolutional neural network (CNN) to extract the feature maps in the input. Each feature map is then processed in a multi-stage CNN pipeline to generate confidence maps of different body part locations such as the neck, right shoulder, right elbow, and right knee. At the same time, a degree of association among different body parts may be determined. In one embodiment, at the first stage of the deep learning, the Cloud server system 114 may be configured to generate an initial set of detection confidence maps and a set of representations of unstructured pairwise relationships among body parts. In each subsequent stage of the deep learning processing, the predictions in the previous stage along with the original image features may be concatenated by the Cloud server system 114 and used to generate more refined predictions of various body parts. As the stage progresses, the initial confusion between different body parts may be resolved and the Cloud server system 114 may be configured to distinguish different body parts more accurately. The final confidence maps and body part relationship determination may then passed into an inference algorithm (e.g., greedy algorithm) for further optimization. Loss functions may be implemented to minimize the error between the predicted and target outputs. Referring to FIGS. 6A, in accordance with aspects of the present disclosure, a single frame (image) of the video uploaded by the user may be extracted by the Cloud server system 114 to determine the skeleton keypoints and overlay estimated joint locations on the image of the same frame, as shown in FIG. 6B.

The estimated 2D joint locations for all the body joints may not be accurate for all the frames, as some of these joints may suffer from occlusion due to obstruction from other body parts or other objects. Therefore, the Cloud server system 114 may be configured to perform post processing steps to recover occluded joint locations 508. In one aspect, for each estimated joint location, the Cloud server system 114 may be configured to detect the frames, where the joint has a low confidence value (likely due to occlusion). In those detected frames, the Cloud server system 114 may interpolate the position of the occluded joint over time based on its angle and distance from its parent joint. For example, a left elbow joint and a left wrist joint of one individual in an image frame are parent-child joints for a specific limb. In some embodiments, a parent-child joint relationship may represent a kinematic and dynamic relationship between two adjacent and connected body joints. A parent joint may refer to a body joint that constrains the degrees of freedom between the parent and child joints.

After post processing of the estimated joint locations, joint angles for certain body regions (e.g., neck, back, hand/wrist, left shoulder, right shoulder, left elbow, right elbow, left knee and right knee) may be calculated 510 by the Cloud server system 114 using the respective joint location estimations.

In one aspect, the Cloud server system 114 may be configured to perform the MSD risk evaluation (calculation of priority risk scores). For example, a MSD risk evaluation may output specific information about a number of body regions, such as shoulder, elbow, or back, with MSD risk scores and the type (posture, duration, frequency, or force) of each risk exposure. These risk scores may be calculated using the joint angle information estimated form the user uploaded video, and optional force information entered by the user.

In one embodiment, in order for the Cloud server system 114 to calculate the risk scores, the joint angles may be compared with respective threshold values to calculate a risk score for each of a plurality of body regions of the worker in each of a plurality of risk categories (e.g., awkward postures, their duration and frequency during the job task). Based upon these individual risk scores, overall risk rating for a specific body region may be calculated. In one embodiment, the overall risk rating may finally be categorized as force risk or posture risk.

As will be described fully below, a priority risk score may be calculated for risk category "Awkward Postures," in accordance with aspects of the present disclosure. Postural risk scores may be determined based on the range of motion for a body joint. Postures that are nearer the extremes of the range of motion are scored as higher risk, while those closer to neutral posture have a lower (or zero) score. Specifically, the Cloud server system 114 may calculate a risk score for each body region (including left and right sides for the upper limbs) for a worker's postures between 0 (no effect) and 3 (highest risk), based on the worst posture that has been identified from the video for that body region.

It is known that human wrist generally acts as a bridge between the hand and the forearm and it is capable of many diverse movements and positions. The neutral position for a wrist typically refers to a position where no major forearm muscles are engaged to maintain a posture. Wrist flexion is the downward bending of the wrist. Wrist extension refers to bending the wrist backwards towards the posterior section of the forearm. Ulnar deviation of the wrist refers to the pivoting of the wrist towards the little finger or ulnar bone. It is also referred to as ulnar flexion. The opposite of ulnar, radial deviation of the wrist points to the bending of the wrist towards the thumb or radial bone, which is also referred to as radial flexion. In one embodiment, the Cloud server system 114 may compare the joint angles of a worker's hand/wrist calculated based on the uploaded video with a number of selected threshold values to determine a risk rating.

In one embodiment, in response to detecting that the hand/wrist flexion angle ≥20 degrees, extension angle ≥20 degrees, ulnar flexion angle ≥10 degrees, and radial angle ≥10 degrees in an awkward posture, the Cloud server system 114 may assign 1 point for this specific body part. Wrist angles may be measured to reflect the pivot of the center of the wrist, with the midline of the forearm and the third metacarpal forming the arms for the angle. Elbow flexion may measure the angle between humerus and radius. Shoulder flexion, extension, and abduction may compare a line parallel with the trunk of the body passing through the top center of the humerus with a line through the middle of the humerus running lengthwise. Back flexion or extension may be based on a line representing the spine using L5-S1 as the end points of the line. A vertical line may be used as the other arm or the angle. Knee flexion may be measured based on the angle between the femur and the fibula. Further, in response to detecting that the hand/wrist flexion angle ≥40 degrees, extension angle ≥40 degrees, ulnar flexion angle ≥20 degrees, and radial angle ≥20 degrees, the Cloud server system 114 may assign 2 points. The highest risk score 3 may be assigned if the hand/wrist flexion angle ≥60 degrees, extension angle ≥60 degrees, ulnar flexion angle ≥30 degrees, and radial angle ≥30 degrees.

In certain embodiments of the present disclosure, elbow posture may be only scored when the worker's shoulder angle is detected to be ≥60 degrees. For example, the Cloud server system 114 may respectively assign 1 point for a detected elbow angle that is between 90 and 119 degrees, 2 points for the range of 120-149 degrees, and highest risk score 3 if the elbow angle is detected to be in the range of 150-180 degrees.

In yet another embodiment, in response to detecting that the shoulder angle ranges between 45 degrees and 89 degrees in a posture, the Cloud server system 114 may assign 1 point for this specific body region. In response to detecting that the shoulder angle is in the range of 90-119 degrees or 0-(−19) degrees, the Cloud server system 114 may assign 2 points. The highest risk score 3 may be assigned if the shoulder angle is detected to be ≥120 degrees, or ≥(−20) degrees.

The neck, also called the cervical spine, is a well-engineered structure of bones, nerves, muscles, ligaments, and tendons. The cervical spine has 7 stacked bones called vertebrae, allowing the neck to move in all directions. For example, the cervical spine can bend directly forward with the chin tilting down. Neck flexion typically occurs when looking downward or while in forward head posture. Neck extension typically occurs when the cervical spine straightens or moves directly backward with the chin tilting up. Neck rotational movement or twist allows the head to turn to one side. Lateral flexion of the cervical spine occurs when the head bends to one side with the ear moving toward the shoulder. In accordance with aspects of the present disclosure, in response to detecting that the forward bend angle is between 140-159 degrees, twist angle ≥20 degrees, or lateral bend angle ≥15 degrees, the Cloud server system 114 may assign 1 point to the posture for this specific body region. Moreover, in response to detecting that the forward bend angle is between 120-139 degrees or backward bend angle is between 0-(−19) degrees, or twist angle >40 degrees, or lateral bend angle >30 degrees, 2 points may be assigned. The highest risk score 3 may be assigned if the forward bend angle ≤119 degrees or backward bend angle ≥(−20) degrees, or twist angle >60 degrees, or lateral bend angle >45 degrees.

The spine or back movements of a person generally include flexion, extension, rotation and lateral flexion, similar to the neck movements described above. These movements occur as a combination of rotation and translation in the sagittal, coronal and horizontal planes. In accordance with aspects of the present disclosure, in response to detecting that the forward bend angle of the back is between 120-149 degrees, twist angle >20 degrees, or lateral bend angle >15 degrees, the Cloud server system 114 may assign 1 point to the posture for this specific body region. Moreover, in response to detecting that the forward bend angle is between 90-119 degrees or backward bend angle is between 0-(−19) degrees, or twist angle >45 degrees, or lateral bend angle >30 degrees, 2 points may be assigned. The highest risk score 3 may be assigned if the forward bend angle ≤89 degrees or backward bend angle ≥(−20) degrees, or twist angle >90 degrees, or lateral bend angle >45 degrees.

In some implementations, the uploaded video of the present disclosure may capture the left-side or right-side sagittal plane views of an operator performing a job. As a result, the Cloud server system 114 may be configured to determine knee angles based upon the perspective of the obtained video recording and compare the knee angles with a number of threshold values. For example, in response to detecting that the knee angle (left or right side) is in the range of 120-149 degrees, the Cloud server system 114 may assign 1 point to the posture for this specific body part. If the knee angle is detected to be between 90-119 degrees, the Cloud server system 114 may assign 2 points. The highest risk score 3 may be assigned if the knee angles is ≤89 degrees.

Generally, ergonomic risk factors act in combination to create a hazard at the workplace. Work tasks that have multiple risk factors have a greater likelihood of causing a WMSD, depending on the duration, frequency, and magnitude of exposure to each. Thus, it is important that ergonomic risk factors be considered in light of their combined effect in causing or contributing to a WMSD.

For example, maintaining the same work positions or postures for a long period of time may increase the amount of force required to do a task because, in addition to the force required to perform the task, contraction forces must be applied to hold the body in position throughout the work shift. Maintaining the same position or posture may require holding the arms and shoulders in a non-neutral posture without moving. The effects of maintaining the same work positions can occur in almost any joint of the body and vary depending on body location. A priority risk score may be calculated for risk category "Duration," in accordance with aspects of the present disclosure.

In an embodiment, the Cloud server system 114 may be configured to identify the worst postures of a work task (e.g., two or worst postures) with risk scores of 1, 2 or 3 from the frame-by-frame analysis of the uploaded video recording and determine the percent of time of one or more body regions in the identified postures. If a body region is involved in the job task between 10-19% of the time in the identified postures, the Cloud server system 114 may assign 1 point to that body region, 2 points if the percent of time is between 20-29% of the time, and 3 points if the percent of time is greater or equal to 30%.

Moreover, a priority risk score may be calculated for risk category "Frequency," in accordance with aspects of the present disclosure. Specifically, the Cloud server system 114 may calculate a score for each body region (including left and right sides for the upper limbs) for a worker's postures between 0 (no effect) and 1, based on the frequency of occurrence during a selected period of time calculated from the video for that body region.

In one embodiment, the Cloud server system 114 may be configured to identify hand/wrist movements in any combination postures scored 1 or higher during a selected period of time (e.g., one minute or any suitable time interval). The Cloud server system 114 may assign 1 point to this body region (hand/wrist) in response to detecting more than 30 such occurrences. For all other body regions, the Cloud server system 114 may assign 1 point in response to detecting more than 3 such occurrences.

Performing forceful exertions requires an application of considerable contraction forces by the body of a worker, which causes muscle fatigue rapidly. Excessive or prolonged exposure to forceful exertions may lead to overuse of muscles and may result in muscle strain, soreness and damage. Performing forceful exertions may also irritate tendons, joints and discs, which may cause inflammation, fluid build-up, and constriction of blood vessels and nerves. Increased compression of nerves from the pressure imposed by inflamed tendons or muscle contractions may cause disorders of the nervous system (carpal tunnel syndrome and other nerve entrapment disorders).

Injuries related to forceful exertions can occur in any tissue or joint. Lifting/lowering, pushing/pulling, and carrying heavy objects are usually the tasks that come to mind as examples of forceful lifting tasks, but high forces are also involved in other types of jobs. These may include jobs that require employees to apply pinch forces with their fingers (picking up or placing small items on an assembly line with the fingers), static forces (applying significant physical effort to put the last turn on a screw, pulling hard on a wrench to loosen a bolt), and dynamic forces (tossing objects into containers).

A priority risk score may be calculated for risk category "High Forces," in accordance with aspects of the present disclosure. The force thresholds are established at levels where the majority of the working population can perform that task with minimal likelihood of over-exertion. Specifically, the Cloud server system 114 may calculate a risk score for each body region (including left and right sides for the upper limbs) in relation to the force applied during a job task between 0 (no effect) and 4 (highest risk), based on the obtained force information. In an embodiment, a plurality of force thresholds may be determined based on a maximum force allowed in the force direction being evaluated. The lower the percentage of the maximum force exerted by the worker, the lower the risk score. For instance, a person applying between 25% and 33% of the maximum force threshold would have 1 point of assigned risk.

Referring back to FIG. 2, in an embodiment, the Cloud server system 114 may calculate a score based on the force required by a job task on a worker's hand/wrist (e.g., "Hands Only" 202). In general, an object may be grasped using one of two methods: a pinch grip or a power grip. A power grip curls the fingers toward the palm; a pinch grip presses the thumb against the fingers of the hand or an object, and does not involve the palm. The amount of force that can be generated depends on the type of grip and the width of the grip. The Cloud server system 114 may assign 1 point if the pinch grip force applied is ≥3 lb, and/or the finger press force is ≥3 lb, and/or the power grip force is ≥13 lb. The Cloud server system 114 may assign 2 points if the pinch grip force applied is ≥5 lb, and/or the finger press force is ≥5 lb, and/or the power grip force is ≥19 lb. The Cloud server system 114 may assign 3 points if the pinch grip force applied is ≥8 lb, and/or the finger press force is ≥9 lb, and/or the power grip force is ≥32 lb. The Cloud server system 114 may assign 4 points if the pinch grip force applied is ≥10 lb, and/or the finger press force is ≥11 lb, and/or the power grip force is ≥41 lb.

For all other body regions, as disclosed previously, the user of the system 100 may provide force information including the force direction and magnitude. The Cloud server system 114 may calculate a score based on the obtained force information. For example, the Cloud server system 114 may assign 1 point to elbow/shoulder movement in a posture in a unilateral direction if the press down force (e.g., "Press Down" 204 in FIG. 2) is ≥6 lb, or exerted lifting/lowering force (e.g., "Lift/Lower" 214 in FIG. 2) is ≥4 lb, or pull across force (e.g., "Pull Across" 212 in FIG. 2) is ≥3 lb, or push out force (shoulder movement) (e.g., "Push Out" 210 in FIG. 2)≥7 lb, or pull in force (elbow movement) (e.g., "Pull In" 208 in FIG. 2) ≥7 lb, or pull down force (e.g., "Pull Down" 206 in FIG. 2)≥9 lb. For another example, the Cloud server system 114 may assign 2 points to elbow/shoulder movement in a posture in a unilateral direction if the press down force (e.g., "Press Down" 204 in FIG. 2) is ≥10 lb, or exerted lifting/lowering force (e.g., "Lift/Lower" 214 in FIG. 2) is ≥6 lb, or pull across force (e.g., "Pull Across" 212 in FIG. 2) is ≥5 lb, or push out force (shoulder movement) (e.g., "Push Out" 210 in FIG. 2) ≥10 lb, or pull in force (elbow movement) (e.g., "Pull In" 208 in FIG. 2) ≥11 lb, or pull down force (e.g., "Pull Down" 206 in FIG. 2) ≥13 lb. Further, the Cloud server system 114 may assign 3 points to elbow/shoulder movement in a posture in a unilateral direction if the press down force (e.g., "Press Down" 204 in FIG. 2) is ≥15 lb, or exerted lifting/lowering force (e.g., "Lift/Lower" 214 in FIG. 2) is ≥10 lb, or pull across force (e.g., "Pull Across" 212 in FIG. 2) is ≥8 lb, or push out force (shoulder movement) (e.g., "Push Out" 210 in FIG. 2) ≥ 17 lb, or pull in force (elbow movement) (e.g., "Pull In" 208 in FIG. 2) ≥19 lb, or pull down force (e.g., "Pull Down" 206 in FIG. 2) ≥22 lb. The highest score 4 may be assigned to elbow/shoulder movement in a posture in a unilateral direction if the press down force (e.g., "Press Down" 204 in FIG. 2) is ≥21 lb, or exerted lifting/lowering force (e.g., "Lift/Lower" 214 in FIG. 2) is ≥12 lb, or pull across force (e.g., "Pull Across" 212 in FIG. 2) is ≥11 lb, or push out force (shoulder movement) (e.g., "Push Out" 210 in FIG. 2) ≥22 lb, or pull in force (elbow movement) (e.g., "Pull In" 208 in FIG. 2) ≥24 lb, or pull down force (e.g., "Pull Down" 206 in FIG. 2) ≥29 lb.

Personal protective equipment (PPE) is a key part of managing health and safety within a variety of industrial workplaces. PPE may include any equipment that is issued to an individual for protection against risks at a workplace (e.g., hard hats, googles, gloves, overalls, trousers, and ear defenders). In accordance with aspects of the present disclosure, the Cloud server system 114 may be configured to obtain PPE information relating to the series of work activities recorded in the uploaded video, and determine a risk score accordingly. For example, when analyzing PPE-associated headache disorder or neck strain or pain as a consequence of wearing of hard hats, protective respirators, face masks or eyewear, the Cloud server system 114 may assign 1 point if the PPE weights ≥2 lb, 2 points if the PPE weights ≥4 lb, 3 points if the PPE weights ≥8 lb, and 4 points if the PPE weights ≥16 lb.

Evidence shows that work requiring stooped or squatting postures is closely associated with high incidence of lower back disorders. The squat lifting movement may be defined as flexing the knees and keeping the back as straight as possible (i.e., no forward flexion in the spine), while the stoop lifting movement is mainly achieved by a forward flexion of the spine without bending the knees. In accordance with aspects of the present disclosure, the Cloud server system 114 may perform an object lifting movement evaluation involving stoop or squat movements and/or whole-body movements. For example, the Cloud server system 114 may be configured to assign 1 point if a posture (stoop or squat) relating to a lifting/lowering movement with 2 hands of a worker and a required force ≥25 lb, or a whole-body pull/pull movement with 2 hands of a worker and a required force ≥50 lb. The Cloud server system 114 may be configured to assign 2 points if a posture (stoop or squat) relating to a lifting/lowering movement with 2 hands of a worker and a required force ≥33 lb, or a whole-body pull/pull movement with 2 hands of a worker and a required force ≥57 lb. The Cloud server system 114 may be configured to assign 3 points if a posture (stoop or squat) relating to a lifting/lowering movement with 2 hands of a worker and a required force ≥42 lb, or a whole-body pull/pull movement with 2 hands of a worker and a required force ≥64 lb. The Cloud server system 114 may be configured to assign 4 points if a posture (stoop or squat) relating to a lifting/lowering movement with 2 hands of a worker and a required force ≥50 lb, or a whole-body pull/pull movement with 2 hands of a worker and a required force ≥71 lb.

In yet another embodiment, the Cloud server system 114 may be configured to assess high forces impact on the legs/knees of a worker. For example, the Cloud server system 114 may be configured to assign 1-4 points in response to detecting that a squatting posture during a lifting/lowering movement with 2 hands of a worker and a required force ≥25 lb, ≥33 lb, ≥42 lb or ≥50 lb, respectively.

In sum, the higher the risk score for a joint or a body region, the higher the priority to assess the direct ergonomic risk causes and provide control recommendations related to the risk for the specific body region. The Cloud server system 114 of the present disclosure may be configured to calculate risk scores in 4 risk categories ("Awkward Posture," "Duration," "Frequency," and "High Forces") for each identified body region and generate a composite score ranging from 0 to 11 for each body region by summing individual scores in each risk category. These body region scores may then be summed to create an overall job score ranging from 0 to 100, with one additional point being added to account for the presence of vibration at the workplace.

Figures 7, 8:
FIG. 7 illustrates generated priority risk scores for different body regions of a worker in a number of different risk categories, according to an exemplary aspect of the present disclosure.
FIG. 8 illustrates an example body region selection page for ergonomic risk root-cause analysis and control suggestions, according to an exemplary aspect of the present disclosure.

After the calculation of priority risk scores, the user-facing application of the system 100 may display all identified body regions in order of priority according to their risk scores, showing the highest risk areas at the top. Referring to FIG. 7, in one embodiment, all evaluated WMSD risk categories 702 (e.g., "Awkward Posture," "Duration," "Frequency," and "Force") may be presented on the left side and all identified body regions 704 may be listed on the top of the display. For each body region, a risk score 706 and the total risk rating 708 (e.g., "Lower Risk," "High Risk," and "Higher Risk") may be calculated and displayed. The user may mark specific force and/or posture for each body region or multiple body regions on the application interface module to address and analyze the direct cause.

For each body region, the Cloud server system 114 of the system 100 may be configured to generate a list of potential causes and additional causes for higher risk that is specific to the body region and is based on whether the user is analyzing force or posture.

From the list of potential causes, the user may be prompted to select the cause that most accurately addresses the force or posture issue. Alternatively, if none of the causes from the list applies, the user may enter a custom cause and provide a short description for it.

Based on the root-cause(s) selected by the user, the system 100 may be configured to generate a list of suggested controls that may be implemented to reduce the risk for this body region. From the list of suggested controls, the user may be prompted to select improvements that may be applied. The user may also add custom improvements.

Figure 9:
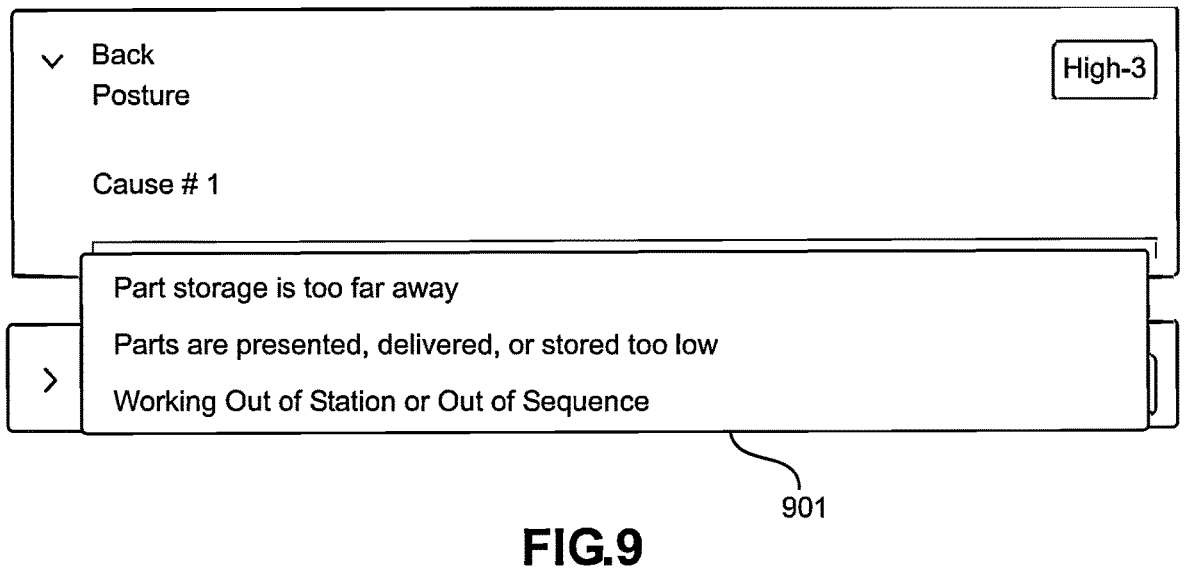
FIG. 9 illustrates example root-causes identified by the system of FIG. 1 for a user selected body region (e.g., back), according to an exemplary aspect of the present disclosure.
Figure 10:
FIG. 10 illustrates example control suggestions for user selected root-causes, according to an exemplary aspect of the present disclosure.

Referring to FIGS. 8-10, the user-facing application of the system 100 may display the results of WMSD risk root-cause analysis and risk controls recommendation after the risk score generation. For example, FIG. 8 displays an example body region selection page for root cause analysis and control suggestions. In one embodiment, body regions that have been identified to have high or higher ergonomic risks may be further selected for direct root-cause analysis in the primary risk exposure types "Force" and "Posture." For example, in response to detecting that the user has selected "Posture Risk" analysis for the back region in FIG. 8, one or more the direct root-causes may be displayed. FIG. 9 shows that Cause No. 1 901 may include certain workplace conditions such as "part storage is too far away from the worker," and worker behaviors such as "parts are presented, delivered or stored too low" or "working out of station or out of sequence." FIG. 10 displays the control suggestions for the selected root causes.

Figure 11:
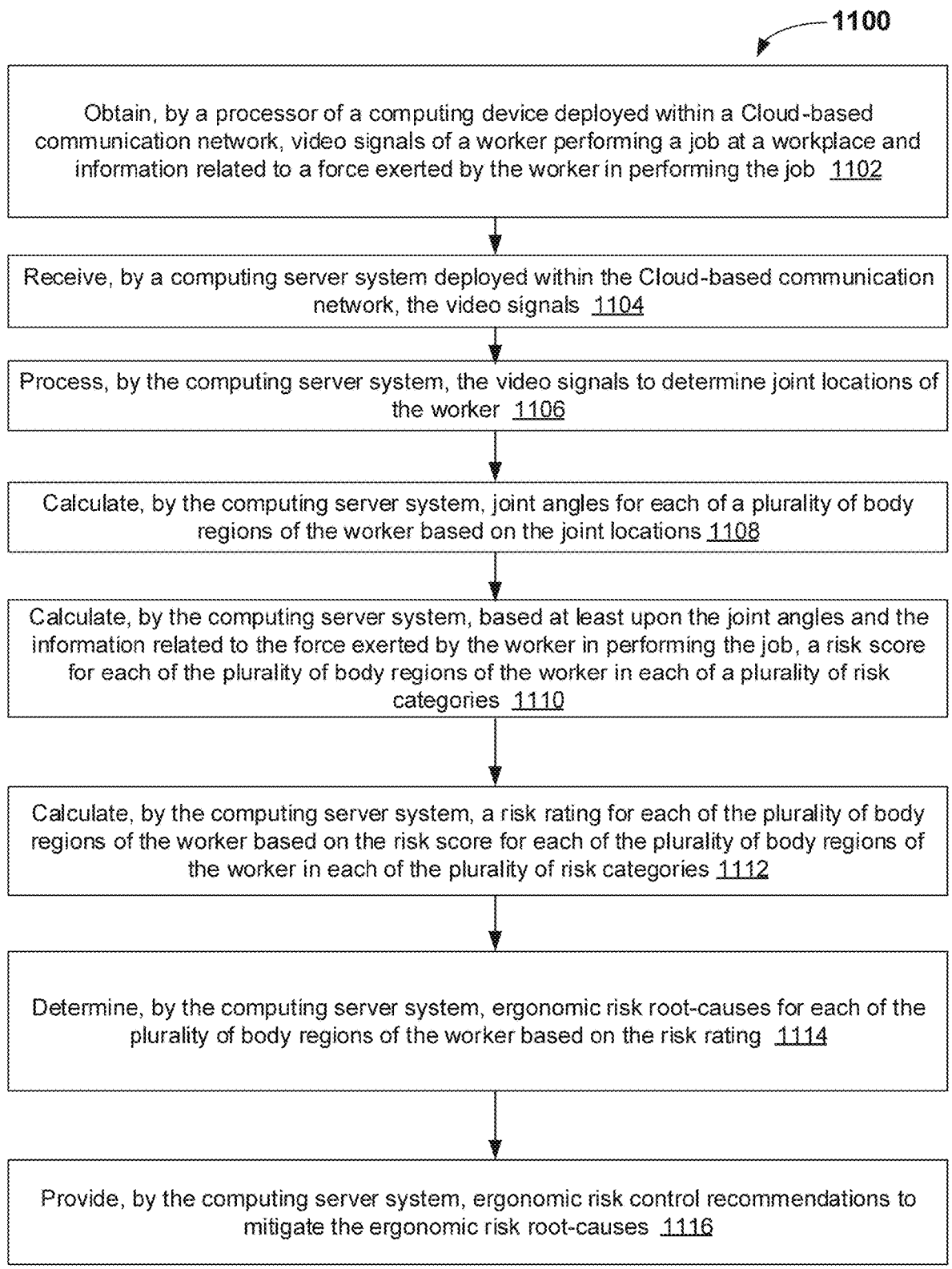
FIG. 11 illustrates a flowchart of a method for identifying industrial ergonomics risk root-causes and providing risk control actions, according to an exemplary aspect of the present disclosure.

According to aspects of the present disclosure, FIG. 11 illustrates a flowchart of a method 1100 for identifying industrial ergonomics risk root-causes and providing risk control actions. Method 1100 may comprise obtaining (1102), by a processor of a computing device deployed within a Cloud-based communication network, video signals of a worker performing a job at a workplace and optional information related to a force exerted by the worker in performing the job. A computing server system deployed within the Cloud-based communication network may be configured to receive (1104) the video signals and process (1106) the video signals to determine joint locations of the worker. In one embodiment, processing the video signals may comprise disassembling the video signals into image frames; using a deep learning model to process each image frame to estimate the joint locations of the worker in each image frame by processing each image frame through a multi-stage convolutional neural network to generate a confidence map for each of the plurality of body regions of the worker and determine a degree of association among the plurality of body regions at each deep learning stage; and identifying one or more image frames including at least one occluded body region based on the confidence map and interpolate a position of the at least one occluded body region based on an angle and distance from a parent joint based at least upon the degree of association among the plurality of body regions.

The method 1100 of the present disclosure also comprises calculating (1108), by the computing server system, joint angles for each of a plurality of body regions of the worker based on the joint locations; and calculating (1110), by the computing server system, based at least upon the joint angles and the information related to the force exerted by the worker in performing the job, a risk score for each of the plurality of body regions of the worker in each of a plurality of risk categories (e.g., an awkward posture category, a duration category, a frequency category, and a force category). The method 1100 may further comprise calculating (1112), by the computing server system, a risk rating for each of the plurality of body regions of the worker based on the risk score for each of the plurality of body regions of the worker in each of the plurality of risk categories.

Moreover, the method 1100 comprises determining (1114), by the computing server system, ergonomic risk root-causes for each of the plurality of body regions of the worker based on the risk rating; and providing (1116), by the computing server system, ergonomic risk control recommendations to mitigate the ergonomic risk root-causes.

Examples of the method according to various aspects of the present disclosure are provided below in the following numbered clauses. An aspect of the method may include any one or more than one, and any combination of, the numbered clauses described below.

Clause 1. An automated injury risk detection and display mitigation system deployed within a cloud-based communication network, the system comprising a computing device, comprising: a non-transitory computer-readable storage medium configured to store an application program; a processor coupled to the non-transitory computer-readable storage medium and configured to control a plurality of modules to execute instructions of the application program to receive image frames; and a computing server system configured to: extract feature maps from the image frames by processing the the image frames through a neural network; generate, by each stage of a multi-stage convolutional neural network (a multi-stage CNN), at least one of confidence maps of body regions or representations of pairwise relationships between the body regions, by processing each of the feature maps by the multi-stage CNN, wherein each subsequent stage of the multi-stage CNN uses at least one of previous confidence maps or previous representations from a previous stage of the multi-stage CNN for a final stage of the multi-stage CNN to generate at least one estimate of the body regions; and provide ergonomic risk control recommendations to mitigate determined ergonomic risk root-causes for at least one body region of the body regions, wherein the determined ergonomic risk root-causes are based on the at least one estimate of the body regions.

Clause 2. The system of Clause 1, wherein the computing server system is further configured to receive video signals from a sensor; and disassemble the video signals into the image frames.

Clause 3. The system of any of Clauses 1-2, wherein the computing server system is further configured to: generate, for at least one body region of the body regions, a risk score for at least one category of a plurality of risk categories, based on the at least one estimate; and generate, for the at least one body region, a risk rating for the at least one category of a plurality of risk categories, based on the risk score, wherein the determined ergonomic risk root-causes are determined for the at least one body region based on at the risk rating.

Clause 4. The system of any of Clauses 1-3 wherein the final stage of the multi-stage CNN uses outputs of at least one previous stage of the multi-stage CNN to generate the at least one estimate, wherein the at least one estimate comprises an estimate of at least one of joint angles in the body regions, joint locations in the body regions, or skeletal points in the body regions.

Clause 5. The system of any of Clauses 1-4, wherein the computing server system is configured to use a deep learning model to process each image frame of the image frames to estimate joint locations in each image frame of the image frames.

Clause 6. The system of any of Clauses 1-5, wherein the computing server system is configured to use the deep learning model to process each image frame of the image frames through the multi-stage CNN to generate a confidence map for at least one body region of the body regions and determine a degree of association among the body regions at each deep learning stage of the deep learning model.

Clause 7. The system of any of Clauses 1-6, wherein the computing server system is further configured to identify one or more image frames of the image frames that comprise at least one occluded body region based on the confidence map and interpolate a position of the at least one occluded body region based on an angle and distance from a parent joint in accordance with the degree of association among the body regions.

Clause 8. The system of any of Clauses 1-7, wherein the body regions comprise a neck part, a back part, a hand/wrist part, a left shoulder part, a right shoulder part, a left elbow part, a right elbow part, a left knee part, and a right knee part.

Clause 9. The system of any of Clauses 1-8, wherein the plurality of risk categories comprise a posture category, a duration category, a frequency category, and a force category.

Clause 10. The system of Clauses 1-9, wherein the computing server system is configured to generate the risk score for each body region of the body regions in the posture category (each body region in the posture category) by at least comparing joint angles for each body region of the body regions with a set of predetermined threshold values, wherein the set of predetermined threshold values correspond to a degree that the joint angles deviate from a neutral position, wherein the risk score for each body region in the posture category increases in response to detecting that the degree increases.

Clause 11. The system of Clauses 1-10, wherein the computing server system is configured to generate the risk score for each body region of the body regions in the duration category (each body region in the duration category) by at least identifying a posture for at least one body region of the body regions based on the image frames, and determining a percent of time of the at least one body region present in the posture, wherein the risk score for each body region in the duration category increases in response to detecting that the percent of time increases.

Clause 12. The system of Clauses 1-11, wherein the computing server system is configured to generate the risk score for each body region of the body regions in the frequency category by at least identifying a number of posture occurrences of at least one body region during a selected period of time.

Clause 13. The system of Clauses 1-12, wherein the computing device is further configured to obtain information related to a force exerted, wherein the computing server system is configured to generate the risk score for each body region of the body regions in the force category by at least comparing the information related to the force exerted with a set of predetermined threshold values, wherein the information related to the force includes a direction and a magnitude of the force, and the risk score for each body region of the body regions in the force category increases in response to detecting that the magnitude of the force increases.

Clause 14. The system of any of Clauses 1-13, wherein the neural network is a baseline convolutional neural network (baseline CNN).

Clause 15. The system of Clauses 1-14, wherein the computing server system is further configured to display, via a color-coded interactive user-interface, selectable regions of the body regions, wherein selection of any of the regions displays at least one of the ergonomic risk root-causes or the ergonomic risk control recommendations to mitigate the ergonomic risk root-causes.

Clause 16. A computer-implemented method, comprising extracting feature maps from image frames by processing the image frames through a neural network; generating, by each stage of a multi-stage convolutional neural network (a multi-stage CNN), at least one of confidence maps of body regions or representations of pairwise relationships between the body regions, by processing each of the feature maps by the multi-stage CNN, wherein each subsequent stage of the multi-stage CNN uses at least one of previous confidence maps or previous representations from a previous stage of the multi-stage CNN for a final stage of the multi-stage CNN to generate at least one estimate of the body regions; and displaying, via a color-coded interactive user-interface, selectable regions of the body regions, wherein selection of any of the regions displays at least one of ergonomic risk root-causes or ergonomic risk control recommendations to mitigate the ergonomic risk root-causes, wherein the ergonomic risk root-causes are based on the at least one estimate of the body regions.

Clause 17. The computer implemented method of Clause 16 further comprising obtaining, by a processor, of a computing device deployed within a cloud-based communication network, video signals; disassembling the video signals into the image frames; and processing each image frame of the image frames using a deep learning model to derive estimate joint locations and corresponding joint angles for each body region in each image frame of the image frames.

Clause 18. The computer-implemented method of any of Clauses 16-17, wherein the processing to derive the estimate the joint locations comprises generating a confidence map by using a deep learning model for the body regions and determine a degree of association among the body regions at each deep learning stage; and identifying one or more image frames that comprise at least one occluded body region based on the confidence map and interpolating a position of the at least one occluded body region based on an angle and distance from a parent joint in accordance with the degree of association among the body regions.

Clause 19. The computer implemented method of any of Clauses 16-18, wherein the neural network is a baseline convolutional neural network (a baseline CNN).

Clause 20. The computer implemented method of any of Clauses 16-19, wherein the final stage of the multi-stage CNN uses outputs at least one previous stage of the multi-stage CNN to generate the at least one estimate, wherein the at least one estimate comprises an estimate of at least one of joint angles in the body regions, joint locations in the body regions, or skeletal points in the body regions.

Clause 21. The computer implemented method of any of Clauses 16-20, further comprising generating, by a computing server system, a risk score for a body region of the body regions in a risk category of risk categories, based on the at least one estimate of the body regions; generating, by the computing server system, a risk rating for the body region of the body regions based on the risk score; and determining, based on the risk rating, by the computing server system, ergonomic risk root-causes for the body region based on the risk rating.

Clause 22. The computer-implemented method of any of Clauses 16-21, wherein the body regions comprise a neck part, a back part, a hand/wrist part, a left shoulder part, a right shoulder part, a left elbow part, a right elbow part, a left knee part, and a right knee part.

Clause 23. The computer-implemented method of any of Clauses 16-22, wherein risk categories comprise a posture category, a duration category, a frequency category, and a force category.

Clause 24. The computer-implemented method of any of Clauses 16-23, further comprising obtaining information related to a force exerted; calculating, by a computing server system, a risk score for each body region of the body regions in the posture category (each body region in the posture category) by at least comparing joint angles for each body region of the body regions with a set of predetermined threshold values, wherein the set of predetermined threshold values correspond to a degree that the joint angles deviate from a neutral position, wherein the risk score for each body region in the posture category increases in response to detecting that the degree increases; calculating, by the computing server system, a risk score for each body region of the body regions in the duration category (each body region in the duration category) by at least identifying a posture for at least one body region of the body regions based on the video signals, and determining a percent of time of the at least one body region present in the posture, wherein the risk score for each body region in the duration category increases in response to detecting that the percent of time increases; calculating, by the computing server system, a risk score for each body region of the body regions in the frequency category by at least identifying a number of posture occurrences of at least one body region during a selected period of time; and calculating, by the computing server system, a risk score for each body region of the body regions in the force category comparing the information related to a force with the set of predetermined threshold values, wherein the information related to the force includes a direction and a magnitude of the force, and the risk score for each body region of the body regions in the force category increases in response to detecting that the magnitude of the force increases.

Clause 25. A non-transitory computer readable medium, storing computer executable instructions to undertake a programmable method, the instructions comprising extracting feature maps from image frames by processing the image frames through a baseline convolutional neural network (baseline CNN); generating, by each stage of a multi-stage convolutional neural network (a multi-stage CNN), at least one of confidence maps of body regions or representations of pairwise relationships between the body regions, by processing each of the feature maps by the multi-stage CNN, wherein each subsequent stage of the multi-stage CNN uses, for the generating, at least one of previous confidence maps or a previous set of representations from a previous stage of the multi-stage CNN; generating at least one estimate of a relationship between the body regions, by a final stage of the multi-stage CNN, wherein the final stage uses outputs of at least one previous stage of the multi-stage CNN to generate the at least one estimate; and determining, by a computing server system, based on the at least one estimate, ergonomic risk root-causes for each body region of the body regions based on the risk rating.

Clause 26. The non-transitory computer readable medium of Clause 25, wherein the computer executable instructions further comprise generating a confidence map for each body region of the body regions, using a deep learning model, wherein the generating comprises determining a degree of association among the body regions at each deep learning stage; and identifying at least one image frame of the image frames including at least one occluded body region based on the confidence map and interpolating a position of the at least one occluded body region based on an angle and distance from a parent joint based in accordance with the degree of association among the body regions.

Clause 27. The non-transitory computer readable medium of any of Clauses 25-26, wherein the computer executable instructions further comprise obtaining, by a processor of a computing device deployed within a cloud-based communication network, video signals from at least one of a passive range sensor or active depth sensor; receiving, by a computing server system deployed within the cloud-based communication network, the video signals from the computing device; disassembling the video signals into the image frames; and processing each image frame of the image frames using a deep learning model to derive estimate joint locations and corresponding joint angles for each body region in each image frame of the image frames.

Clause 28. The non-transitory computer readable medium of any of Clauses 25-27, wherein the at least one estimate comprises an estimate of at least one of joint angles in the body regions, joint locations in the body regions, or skeletal points in the body regions.

Clause 29. The non-transitory computer readable medium of any of Clauses 25-28, wherein the computer executable instructions further comprise generating, a risk score for at least one category of a plurality of risk categories based at least upon the estimate; and generating a risk rating for each body region of the body regions based on the risk score.

Clause 30. The non-transitory computer readable medium of Clauses 25-29, wherein the body regions comprise a neck part, a back part, a hand/wrist part, a left shoulder part, a right shoulder part, a left elbow part, a right elbow part, a left knee part, and a right knee part.

Clause 31. The non-transitory computer readable medium of Clauses 25-30, wherein the plurality of risk categories comprise a posture category, a duration category, a frequency category, and a force category.

Clause 32. The non-transitory computer readable medium of Clauses 25-31, wherein the computer executable instructions further comprise: obtaining information related to a force exerted; calculating the risk score for each body region of the body regions in the posture category (each body region in the posture category) by at least comparing the joint angles for each body region of the body regions with a set of predetermined threshold values, wherein the set of predetermined threshold values correspond to a degree that the joint angles deviate from a neutral position, and the risk score for each body region in the posture category increases in response to detecting that the degree increases; calculating the risk score for each body region of the body regions in the duration category by at least identifying a posture for each body region based on the image frames, and determining a percent of time each body region is present in the posture, wherein the risk score for each body region of the body regions in the duration category increases in response to detecting that the percent of time increases; calculating the risk score for each body region of the body regions in the frequency category by at least identifying a number of posture occurrences of each body region during a selected period of time; and calculating the risk score for each body region of the body regions in the force category (each body region in the force category) by at least comparing the information related to the force with the set of predetermined threshold values, wherein the information related to the force includes a direction and a magnitude of the force, and the risk score for each body region in the force category increases in response to detecting that the magnitude of the force increases.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. An automated injury risk detection and display mitigation system deployed within a cloud-based communication network, the system comprising:
 a computing device, comprising:
  a non-transitory computer-readable storage medium configured to store an application program;
  a processor coupled to the non-transitory computer-readable storage medium and configured to control a plurality of modules to execute instructions of the application program to receive image frames; and
 a computing server system configured to:
  extract feature maps from the image frames by processing the the image frames through a neural network;
  generate, by each stage of a multi-stage convolutional neural network (a multi-stage CNN), at least one of confidence maps of body regions or representations of pairwise relationships between the body regions, by processing each of the feature maps by the multi-stage CNN, wherein each subsequent stage of the multi-stage CNN uses at least one of previous confidence maps or previous representations from a previous stage of the multi-stage CNN for a final stage of the multi-stage CNN to generate at least one estimate of the body regions; and provide ergonomic risk control recommendations to mitigate determined ergonomic risk root-causes for at least one body region of the body regions, wherein the determined ergonomic risk root-causes are based on the at least one estimate of the body regions.

2. The system of claim 1, wherein the computing server system is further configured to:
receive video signals from a sensor; and
disassemble the video signals into the image frames.

3. The system of claim 1, wherein the computing server system is further configured to:
generate, for at least one body region of the body regions, a risk score for at least one category of a plurality of risk categories, based on the at least one estimate; and
generate, for the at least one body region, a risk rating for the at least one category of the plurality of risk categories, based on the risk score,
wherein the determined ergonomic risk root-causes are determined for the at least one body region based on at the risk rating.

4. The system of claim 3, wherein the plurality of risk categories comprise a posture category, a duration category, a frequency category, and a force category.

5. The system of claim 4, wherein the computing server system is configured to generate the risk score for each body region of the body regions in the posture category by at least comparing joint angles for each body region of the body regions with a set of predetermined threshold values, wherein the set of predetermined threshold values correspond to a degree that the joint angles deviate from a neutral position, wherein the risk score for each body region in the posture category increases in response to detecting that the degree increases.

6. The system of claim 4, wherein the computing server system is configured to generate the risk score for each body region of the body regions in the duration category by at least identifying a posture for at least one body region of the body regions based on the image frames, and determining a percent of time of the at least one body region present in the posture, wherein the risk score for each body region in the duration category increases in response to detecting that the percent of time increases.

7. The system of claim 4, wherein the computing server system is configured to generate the risk score for each body region of the body regions in the frequency category by at least identifying a number of posture occurrences of at least one body region during a selected period of time.

8. The system of claim 4, wherein the computing device is further configured to obtain information related to a force exerted, wherein the computing server system is configured to generate the risk score for each body region of the body regions in the force category by at least comparing the information related to the force exerted with a set of predetermined threshold values, wherein the information related to the force exerted includes a direction and a magnitude of the force exerted, and the risk score for each body region of the body regions in the force category increases in response to detecting that the magnitude of the force exerted increases.

9. The system of claim 1 wherein the final stage of the multi-stage CNN uses outputs of at least one previous stage of the multi-stage CNN to generate the at least one estimate, wherein the at least one estimate comprises an estimate of at least one of joint angles in the body regions, joint locations in the body regions, or skeletal points in the body regions.

10. The system of claim 1, wherein the computing server system is configured to use a deep learning model to process each image frame of the image frames to estimate joint locations in each image frame of the image frames.

11. The system of claim 10, wherein the computing server system is configured to use the deep learning model to process each image frame of the image frames through the multi-stage CNN to generate a confidence map for at least one body region of the body regions and determine a degree of association among the body regions at each deep learning stage of the deep learning model.

12. The system of claim 11, wherein the computing server system is further configured to identify one or more image frames of the image frames that comprise at least one occluded body region based on the confidence map and interpolate a position of the at least one occluded body region based on an angle and distance from a parent joint in accordance with the degree of association among the body regions.

13. The system of claim 1, wherein the body regions comprise a neck part, a back part, a hand/wrist part, a left shoulder part, a right shoulder part, a left elbow part, a right elbow part, a left knee part, and a right knee part.

14. The system of claim 1, wherein the neural network is a baseline convolutional neural network (baseline CNN).

15. The system of claim 1, wherein the computing server system is further configured to:
display, via a color-coded interactive user-interface, selectable regions of the body regions, wherein selection of any of the regions displays at least one of the determined ergonomic risk root-causes or the ergonomic risk control recommendations to mitigate the determined ergonomic risk root-causes.

16. A computer-implemented method, comprising:
extracting feature maps from image frames by processing the image frames through a neural network;
generating, by each stage of a multi-stage convolutional neural network (a multi-stage CNN), at least one of confidence maps of body regions or representations of pairwise relationships between the body regions, by processing each of the feature maps by the multi-stage CNN, wherein each subsequent stage of the multi-stage CNN uses at least one of previous confidence maps or previous representations from a previous stage of the multi-stage CNN for a final stage of the multi-stage CNN, and generating at least one estimate of the body regions; and
displaying, via a color-coded interactive user-interface, selectable regions of the body regions, wherein selection of any of the regions displays at least one of ergonomic risk root-causes or ergonomic risk control recommendations to mitigate the ergonomic risk root-causes, wherein the ergonomic risk root-causes are based on the at least one estimate of the body regions.

17. The computer implemented method of claim 16 further comprising:
  obtaining, by a processor, of a computing device deployed within a cloud-based communication network, video signals;
  disassembling the video signals into the image frames; and
  processing each image frame of the image frames using a deep learning model to derive estimate joint locations and corresponding joint angles for each body region in each image frame of the image frames.

18. The computer-implemented method of claim 17, wherein the processing to derive the estimate joint locations comprises:
  generating a confidence map by using the deep learning model for the body regions and determining a degree of association among the body regions at each deep learning stage; and
  identifying one or more image frames that comprise at least one occluded body region based on the confidence map and interpolating a position of the at least one occluded body region based on an angle and distance from a parent joint in accordance with the degree of association among the body regions.

19. The computer implemented method of claim 17, further comprising:
  generating, by a computing server system, a risk score for a body region of the body regions in a risk category of risk categories, based on the at least one estimate of the body regions;
  generating, by the computing server system, a risk rating for the body region of the body regions based on the risk score; and
  determining, based on the risk rating, by the computing server system, ergonomic risk root-causes for the body region based on the risk rating.

20. The computer-implemented method of claim 19, wherein the risk categories comprise a posture category, a duration category, a frequency category, and a force category.

21. The computer-implemented method of claim 20, further comprising:
  obtaining information related to a force exerted;
  calculating, by a computing server system, the risk score for each body region of the body regions in the posture category by at least comparing joint angles for each body region of the body regions with a set of predetermined threshold values, wherein the set of predetermined threshold values correspond to a degree that the joint angles deviate from a neutral position, wherein the risk score for each body region in the posture category increases in response to detecting that the degree increases;
  calculating, by the computing server system, the risk score for each body region of the body regions in the duration category by at least identifying a posture for at least one body region of the body regions based on the video signals, and determining a percent of time of the at least one body region present in the posture, wherein the risk score for each body region in the duration category increases in response to detecting that the percent of time increases;
  calculating, by the computing server system, the risk score for each body region of the body regions in the frequency category by at least identifying a number of posture occurrences of a body region during a selected period of time; and
  calculating, by the computing server system, the risk score for each body region of the body regions in the force category comparing the information related to the force exerted with the set of predetermined threshold values, wherein the information related to the force exerted includes a direction and a magnitude of the force exerted, and the risk score for each body region of the body regions in the force category increases in response to detecting that the magnitude of the force exerted increases.

22. The computer implemented method of claim 16, wherein the neural network is a baseline convolutional neural network (a baseline CNN).

23. The computer implemented method of claim 16, wherein the final stage of the multi-stage CNN uses outputs of at least one previous stage of the multi-stage CNN for generating the at least one estimate, wherein the at least one estimate comprises an estimate of at least one of joint angles in the body regions, joint locations in the body regions, or skeletal points in the body regions.

24. The computer-implemented method of claim 16, wherein the body regions comprise a neck part, a back part, a hand/wrist part, a left shoulder part, a right shoulder part, a left elbow part, a right elbow part, a left knee part, and a right knee part.

25. A non-transitory computer readable medium, storing computer executable instructions to undertake a programmable method, the instructions comprising:
  extracting feature maps from image frames by processing the image frames through a baseline convolutional neural network (baseline CNN);
  generating, by each stage of a multi-stage convolutional neural network (a multi-stage CNN), at least one of confidence maps of body regions or representations of pairwise relationships between the body regions, by processing each of the feature maps by the multi-stage CNN, wherein each subsequent stage of the multi-stage CNN uses, for the generating, at least one of previous confidence maps or a previous set of representations from a previous stage of the multi-stage CNN;
  generating at least one estimate of a relationship between the body regions, by a final stage of the multi-stage CNN, wherein the final stage uses outputs of at least one previous stage of the multi-stage CNN to generate the at least one estimate; and
  determining, by a computing server system, based on the at least one estimate, ergonomic risk root-causes for each body region of the body regions based on a risk rating for each body region of the body regions.

26. The non-transitory computer readable medium of claim 25, wherein the computer executable instructions further comprise:
  generating a confidence map for each body region of the body regions, using a deep learning model, wherein the generating comprises determining a degree of association among the body regions at each deep learning stage; and
  identifying at least one image frame of the image frames including at least one occluded body region based on the confidence map and interpolating a position of the at least one occluded body region based on an angle and distance from a parent joint based in accordance with the degree of association among the body regions.

27. The non-transitory computer readable medium of claim 26, wherein the computer executable instructions further comprise:
- obtaining, by a processor of a computing device deployed within a cloud-based communication network, video signals from at least one of a passive range sensor or active depth sensor;
- receiving, by a computing server system deployed within the cloud-based communication network, the video signals from the computing device;
- disassembling the video signals into the image frames; and
- processing each image frame of the image frames using the deep learning model to derive estimate joint locations and corresponding joint angles for each body region in each image frame of the image frames.

28. The non-transitory computer readable medium of claim 26, wherein the at least one estimate comprises an estimate of at least one of joint angles in the body regions, joint locations in the body regions, or skeletal points in the body regions.

29. The non-transitory computer readable medium of claim 28, wherein the computer executable instructions further comprise:
- generating, a risk score for at least one category of a plurality of risk categories based at least upon the estimate; and
- generating the risk rating for each body region of the body regions based on the risk score.

30. The non-transitory computer readable medium of claim 29, wherein the plurality of risk categories comprise a posture category, a duration category, a frequency category, and a force category.

31. The non-transitory computer readable medium of claim 30,
wherein the computer executable instructions further comprise:
- obtaining information related to a force exerted;
- calculating the risk score for each body region of the body regions in the posture category by at least comparing the joint angles for each body region of the body regions with a set of predetermined threshold values, wherein the set of predetermined threshold values correspond to a degree that the joint angles deviate from a neutral position, and the risk score for each body region in the posture category increases in response to detecting that the degree increases;
- calculating the risk score for each body region of the body regions in the duration category by at least identifying a posture for each body region based on the image frames, and determining a percent of time each body region is present in the posture, wherein the risk score for each body region of the body regions in the duration category increases in response to detecting that the percent of time increases;
- calculating the risk score for each body region of the body regions in the frequency category by at least identifying a number of posture occurrences of each body region during a selected period of time; and
- calculating the risk score for each body region of the body regions in the force category by at least comparing the information related to the force exerted with the set of predetermined threshold values, wherein the information related to the force exerted includes a direction and a magnitude of the force exerted, and the risk score for each body region in the force category increases in response to detecting that the magnitude of the force exerted increases.

32. The non-transitory computer readable medium of claim 25, wherein the body regions comprise a neck part, a back part, a hand/wrist part, a left shoulder part, a right shoulder part, a left elbow part, a right elbow part, a left knee part, and a right knee part.

* * * * *